US009286340B2

(12) United States Patent
Schlomka et al.

(10) Patent No.: US 9,286,340 B2
(45) Date of Patent: Mar. 15, 2016

(54) SYSTEMS AND METHODS FOR COLLECTING INFORMATION FROM DIGITAL MEDIA FILES

(71) Applicant: Sogidia AG, Kiel (DE)

(72) Inventors: Norman Schlomka, Flensburg (DE); Michael Conway, Chapel Hill, NC (US)

(73) Assignee: SOGIDIA AG, Kiel (DE)

( * ) Notice: Subject to any disclaimer, the term of this patent is extended or adjusted under 35 U.S.C. 154(b) by 206 days.

(21) Appl. No.: 13/946,208

(22) Filed: Jul. 19, 2013

(65) Prior Publication Data

US 2014/0372372 A1 Dec. 18, 2014

(30) Foreign Application Priority Data

Jun. 14, 2013 (DE) .................. 10 2013 009 958

(51) Int. Cl.
*G06F 17/30* (2006.01)

(52) U.S. Cl.
CPC .... *G06F 17/30345* (2013.01); *G06F 17/30029* (2013.01)

(58) Field of Classification Search
CPC ... G06F 17/30345; G06F 17/30; G06Q 50/01; G06Q 10/10; G06Q 30/0269; G06Q 30/0244; G06Q 30/0255; G06Q 30/0277; G06Q 10/02; G06Q 30/0261; G06Q 30/0267; G06Q 10/06; G06Q 10/063; G06Q 10/0633; G06Q 10/101
USPC .......... 707/609, 634, E17.005, 769, 749, 600, 707/709, E17.014, E17.033, E17.002, 707/E17.044, E17.108, E17.032; 705/26, 705/22, 25, 7, 39, 52, 27.2, 26.1, 26.7, 347, 705/303, 319, 400, 14.66, 14.7, 14.49, 705/14.53, 14.25, 14.39, 14.4, 14.36, 7.32, 705/27.1; 709/204, 200, 206, 224, 203, 709/219, 218, 217, 230, 231, 223; 715/762, 715/745, 230; 455/550.1; 382/118, 103; 718/102

See application file for complete search history.

(56) References Cited

U.S. PATENT DOCUMENTS 7,970,934 B1 * 6/2011 Patel .................... H04L 41/147
                                                        709/244
8,019,692 B2    9/2011 Rosen
                (Continued)

FOREIGN PATENT DOCUMENTS

EP    1 296 253    3/2003
EP    2 219 162    8/2010
                (Continued)

OTHER PUBLICATIONS

Robert E. Mann, Edward Adlaf, Jinhui Zhao, Gina Stoduto, Anca Ialomiteanu, Reginald G. Smart, Mark Asbridge—"Cannabis use and self-reported collisions in a representative sample of adult drivers"—Journal of Safety Research vol. 38, Issue 6, 2007, pp. 669-674.*

(Continued)

*Primary Examiner* — Anh Ly
(74) *Attorney, Agent, or Firm* — Fredrikson & Byron P.A.

(57) ABSTRACT

Systems and methods for collecting information from digital media files. More specifically, a collection module may be used to communicate with a social networking system and analyze the digital media files associated with a user profile. The collection module may generate media-based profile information based on media content and/or location, time and date data extracted from the digital media files. The media-based profile information may be incorporated into the user profile information and used by the social networking system for various purposes.

14 Claims, 6 Drawing Sheets

(56) References Cited

U.S. PATENT DOCUMENTS

| | | | | |
|---|---|---|---|---|
| 2005/0170528 | A1* | 8/2005 | West | G06K 9/6282 436/518 |
| 2005/0177614 | A1 | 8/2005 | Bourne | |
| 2006/0004699 | A1 | 1/2006 | Lehikoinen et al. | |
| 2006/0018522 | A1 | 1/2006 | Sunzeri et al. | |
| 2006/0085419 | A1 | 4/2006 | Rosen | |
| 2006/0141493 | A1* | 6/2006 | West | C12Q 1/6883 435/6.11 |
| 2007/0172844 | A1* | 7/2007 | Lancaster | C12Q 1/6886 435/6.12 |
| 2008/0209351 | A1* | 8/2008 | Macadaan et al. | 715/762 |
| 2008/0294607 | A1* | 11/2008 | Partovi et al. | 707/3 |
| 2008/0298643 | A1* | 12/2008 | Lawther et al. | 382/118 |
| 2008/0306830 | A1* | 12/2008 | Lasa et al. | 705/26 |
| 2009/0024539 | A1* | 1/2009 | Decker | G06Q 40/06 705/36 R |
| 2009/0228371 | A1* | 9/2009 | Williams | 705/27 |
| 2010/0153213 | A1* | 6/2010 | Pomplun et al. | 705/14.53 |
| 2010/0199188 | A1* | 8/2010 | Abu-Hakima et al. | 715/733 |
| 2010/0228617 | A1* | 9/2010 | Ransom et al. | 705/14.25 |
| 2010/0268728 | A1* | 10/2010 | Tadlock et al. | 707/769 |
| 2011/0010423 | A1 | 1/2011 | Thatcher et al. | |
| 2011/0066366 | A1* | 3/2011 | Ellanti et al. | 715/733 |
| 2011/0099142 | A1 | 4/2011 | Karjalainen et al. | |
| 2011/0099263 | A1* | 4/2011 | Patil et al. | 709/224 |
| 2011/0125531 | A1* | 5/2011 | Seare | G06F 19/328 705/3 |
| 2011/0126184 | A1 | 5/2011 | Lisboa | |
| 2011/0145074 | A1* | 6/2011 | Polizzotto | 705/14.66 |
| 2011/0264527 | A1* | 10/2011 | Fitzpatrick et al. | 705/14.55 |
| 2011/0313861 | A1* | 12/2011 | Lawrence et al. | 705/14.64 |
| 2012/0023131 | A1* | 1/2012 | Downey et al. | 707/769 |
| 2012/0027256 | A1* | 2/2012 | Kiyohara et al. | 382/103 |
| 2012/0047184 | A1* | 2/2012 | Purdy | 707/803 |
| 2012/0059850 | A1 | 3/2012 | Bent et al. | |
| 2012/0066026 | A1* | 3/2012 | Dusig et al. | 705/7.32 |
| 2012/0072493 | A1* | 3/2012 | Muriello et al. | 709/204 |
| 2012/0076367 | A1* | 3/2012 | Tseng | 382/118 |
| 2012/0197979 | A1* | 8/2012 | Palm et al. | 709/203 |
| 2012/0284333 | A1* | 11/2012 | Neff | 709/204 |
| 2012/0303659 | A1* | 11/2012 | Erhart et al. | 707/769 |
| 2012/0324004 | A1* | 12/2012 | Le et al. | 709/204 |
| 2013/0085828 | A1* | 4/2013 | Schuster | 705/14.25 |
| 2013/0226201 | A1* | 8/2013 | Miller | A61B 17/1285 606/142 |
| 2014/0095325 | A1* | 4/2014 | Kim | G06Q 30/0275 705/14.71 |

FOREIGN PATENT DOCUMENTS

| | | |
|---|---|---|
| EP | 2354969 | 8/2011 |
| GB | 2 455 055 | 6/2009 |
| WO | 02/37323 | 5/2002 |
| WO | 2011/005360 | 1/2011 |
| WO | 2012/033776 | 3/2012 |

OTHER PUBLICATIONS

Megan L. Ranney, Esther K. Choo, Yvonne Wang, Andrew Baum, Melissa A. Clark, Michael J. Mello—"Injury prevention/original research—Emergency Department Patients' Preferences for Technology-Based Behavioral Interventions"—Annals of Emergency Medicine—vol. 60, Issue 2, Aug. 2012, pp. 218-227.e48.*

* cited by examiner

SYSTEMS AND METHODS FOR COLLECTING INFORMATION FROM DIGITAL MEDIA FILES

FIELD

The disclosure generally relates to systems and methods for collecting information from digital media.

BACKGROUND

Social networking systems may be used to connect individuals with each other based on some commonality between the individuals. Generally, social networking systems allow individuals to create a user profile on a website. The user profile may contain social networking information specified by the user which may include, for example, biographical information (i.e. name, age, gender, etc.), education information (i.e. current school, highest degree, etc.), personal information (i.e. interests, hobbies, relationship status, etc.) or professional information (i.e. occupation, company, etc.). Social networking information included in user profiles may be used by a social networking system to generate matches between individuals and connect them.

The user profile may also contain digital media files like photographs, movies or sound recordings that have been uploaded by the user to the user profile. Digital media files may be captured by a camera, video camera, cell phone, smart phone, tablet, laptop or other device capable of creating a digital media file. These devices may have internet connectivity and may be capable of directly uploading the digital media files to the user profile via a website of the social networking system.

SUMMARY

In one embodiment, a method of collecting social networking information includes the steps of accessing, using a computing device including one or more programmable processers, a user profile associated with a user, the user profile including profile information and digital media files, extracting media content from each digital media file, determining a set of potential interests for each digital media file based on the media content of each respective digital media file, analyzing the digital media and automatically generating media-based profile information, and incorporating the media-based profile information into the user profile.

The step of determining a set of potential interests may further include the steps of analyzing the media content to generate a suspected content associated to the media content, determining a set of potential interests based on the suspected content by accessing a data repository, and wherein the data repository contains information correlating suspected content with potential interests.

The step of analyzing the digital media may further include the steps of extracting location, time and date data from each digital media file, determining a set of potential interests associated with each digital media file based on the location, time and date data, and analyzing the set of potential interests of the digital media files to generate media-based profile information.

The step of determining a set of potential interests may further include the steps of determining a geographic location and event corresponding to the location, time and date data by accessing a data repository, determining the set of potential interests based on the geographic location and event by accessing the data repository, and wherein the data repository contains information correlating location, time and date data with geographic location and events, and geographic location and events with the sets of potential interests.

The step of analyzing the set of potential interests of the digital media files to generate media-based profile information may further include the steps of calculating a confidence interval for each potential interest determined, and generating media-based profile information from the potential interests using the confidence interval.

In a further embodiment, a system including a social networking system which includes a plurality of user profiles, the user profiles including profile information and at least one digital media file, at least one programmable processor adapted to execute a collection module, a data repository which includes information correlating suspected content with potential interests, wherein the collection module is adapted to receive digital media files from the social networking system, the collection module is adapted to analyze the digital media files to determine a suspected content for each of the digital media files, the collection module is further adapted to access the data repository to determine a set of potential interests based on the suspected content of the digital media file for each of the digital media files, the collection module is adapted to analyze the sets of potential interests to generate media-based profile information, and the collection module is adapted to incorporate the media-based profile information into the user profile.

In another example, the data repository may further include information correlating location, time and date data with geographic locations and events, and geographic location and events with potential interests.

In another example, the collection module may be adapted to analyze the digital media files to determine location, time and date data for each of the digital media files, and be adapted to access the data repository to determine a set of potential interests based on the location, time and date data for each of the digital media files.

In a further embodiment, a non-transitory computer-readable storage article having computer-executable instructions stored thereon which comprise a collection module, wherein the computer executable instructions cause at least one programmable processor to receive digital media files from a user profile, analyze the digital media files to determine a suspected content for each of the digital media files, access a data repository to determine a set of potential interests based on the suspected content of the digital media files for each of the digital media files, analyze the sets of potential interests to generate media-based profile information, and incorporate the media-based profile information into the user profile.

In another example, the computer-executable instructions may cause the at least one programmable processor to analyze the digital media files to determine location, time and date data for each of the digital media files, and access a data repository to determine a set of potential interests based on the location, time and date data for each of the digital media files.

BRIEF DESCRIPTION OF THE DRAWINGS

The following drawings illustrate some particular embodiments of the present invention and therefore do not limit the scope of the invention. The drawings are not to scale (unless so stated) and are intended for use in conjunction with the explanations in the following detailed description. Some embodiments will hereinafter be described in conjunction with the appended drawings, wherein like numerals denote like elements.

DETAILED DESCRIPTION OF THE PREFERRED EMBODIMENTS

The following detailed description is exemplary in nature and is not intended to limit the scope, applicability, or configuration of the invention any way. Rather, the following description provides some practical illustrations for implementing some embodiments of the present invention. Those skilled in the art will recognize that many of the noted examples have a variety of suitable alternatives.

Figure 1:
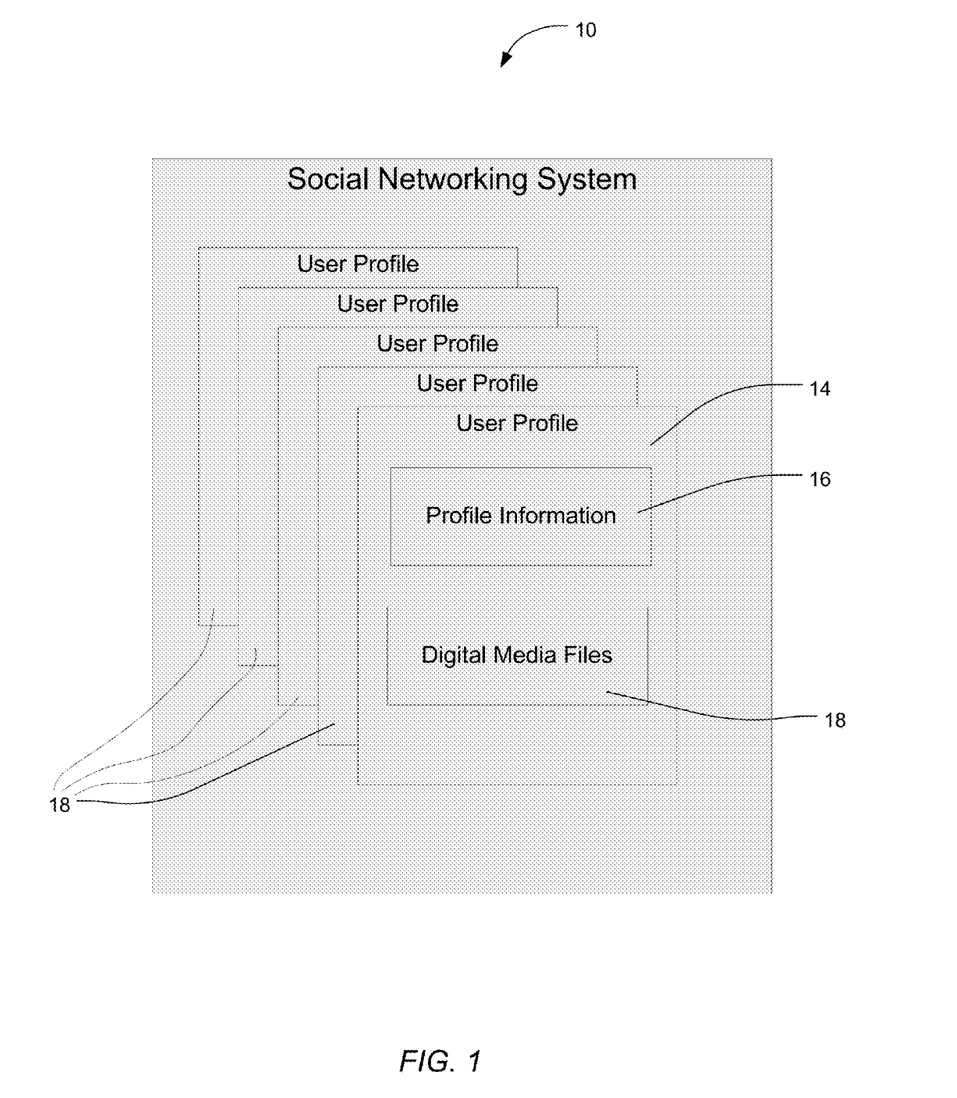
FIG. 1 is a block diagram of a social networking system that may be used according to an embodiment of the invention.

FIG. 1 illustrates a block diagram of a social networking system 10 that may be used according to an embodiment of the invention. Social networking system 10 may represent any conventional social networking site and may include a plurality of user profiles 12 associated to respective users of social networking system 10. Generally, individuals may create a user profile on social networking system 10 via a website (not shown). As will be discussed in further detail below, social networking system 10 generally provides a means to connect individuals with each other based on some commonality between the user profiles of the individuals. Social networking system 10 may include user profile 14 that is associated with a user. User profile 14 may include profile information 16 and digital media files 18.

Profile information 16 may be any social networking information specified by a user and may be provided, for example, when the user creates or updates user profile 14. Profile information 16 may include any social networking information pertaining to the individual including, but not limited to, biographical, personal, professional and education information. Social networking system 10 may match user profile 14 with other user profiles based on a commonality between the profile information of the user profiles. For example, the profile information of a first user profile may include social networking information that specifies that the user attended ACME High School. Social networking system 10 may use this information to connect the user with other user profiles with profile information specifying attendance at ACME High School.

User profile 14 may also include a plurality of digital media files 18. Digital media files 18 may be, for example, any photo, movie or sound recording in an electronic format. Digital media files 18 may be uploaded to user profile 14 on social networking system 10 by the user. As will be discussed below, digital media files 18 may be uploaded to the website of the social networking system 10 from a computer connected to the internet. In another example, the digital media file may be uploaded to a user profile directly from a mobile device with internet connectivity, like a cell phone, smart phone or tablet.

Figure 2:
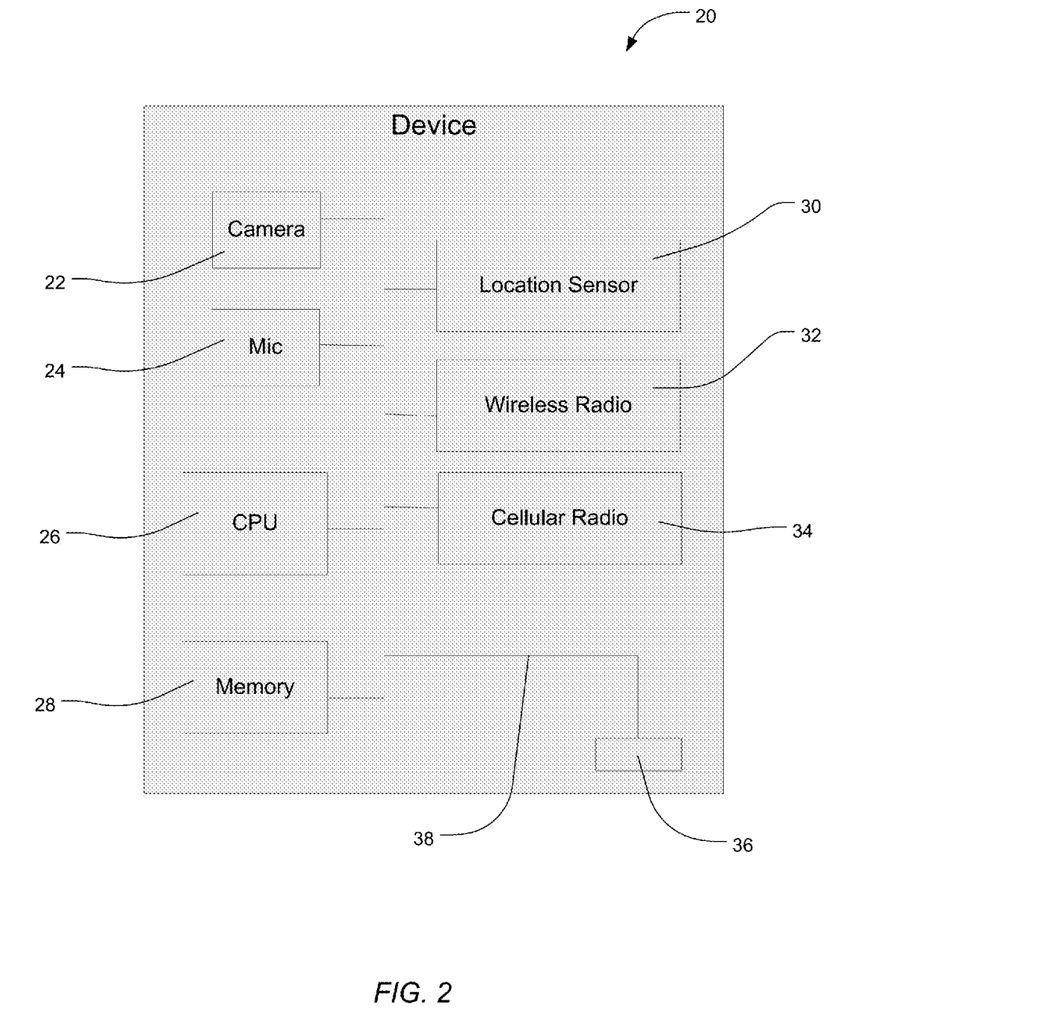
FIG. 2 is a block diagram of a device that generates digital media files that may be used according to an embodiment of the invention.

FIG. 2 illustrates a block diagram of a generating device 20 that may be used to generate digital media files according to an embodiment of the invention. Generating device 20 may be any device capable of capturing, storing and transferring a digital media file, for example a video camera, cell phone, smart phone, tablet, laptop, computer or scanner. Generating device 20 may include one or more of a camera 22, microphone 24, location sensor 30, wireless radio 32, cellular radio 34, non-volatile memory 28, connector 36, processor 26 and bus 38.

Camera 22 and microphone 24 may be used to capture digital media content. For example, camera 22 may be used to take pictures, microphone 24 may be used to collect sound recordings, or the two components may be used in tandem to capture a video with sound.

Generating device 20 may also include location sensor 30 configured to receive location data and/or time and date data. Location data may be any data that represents a geographic location. In one example, location sensor 30 may be a global positioning system (GPS) receiver that receives a latitude and longitude coordinate as well as time and date data from a global positioning system.

Wireless radio 32 may be configured to connect generating device 20 to a wireless network to send and receive information. In one example, wireless radio 32 may be configured to communicate on a WLAN network using IEEE 802.11 protocols. Cellular radio 34 may be configured to connect generating device 20 to a cellular network also to send and receive information. Wireless radio 32 and/or cellular radio 34 may also be configured to receive location data and time and date data. In one example, wireless radio 32 may collect signal strength of nearby WLAN access points and triangulate a location based on the known location of the access points. In another example, wireless radio 32 may communicate the signal strength to a third-party service, like Skyhook Wireless Inc., to help triangulate a location and return location data to generating device 20. Similarly, in another example, cellular radio 34 may user similar methods using the signal strength from nearby cellular towers.

Generating device 20 may also include a processor 26 to drive and control all the components of the device. In one example, processor 26 may be used to combine the digital media content captured by camera 22 and/or microphone 24 with the location data received or derived from location sensor 30, wireless radio 32 and/or cellular radio 34 to create a digital media file 40 (illustrated in FIG. 3). In another example, generating device 20 may not include location sensor 20 or wireless radio 32 and time and date data may be derived from a clock (not shown) of generating device 20. The resulting digital media file 40 may then include location data descriptive of a geographic location where the digital media file 40 was created. Similarly, processor 26 may be used to append time and date data descriptive of the time and date digital media file was created. Digital media file 40 may be stored on non-volatile memory 28 where it may be transferred to a computer via connector 36, or directly uploaded to a user profile 14 of social networking system 10 via the wireless radio 32 or cellular radio 34.

Figure 3:
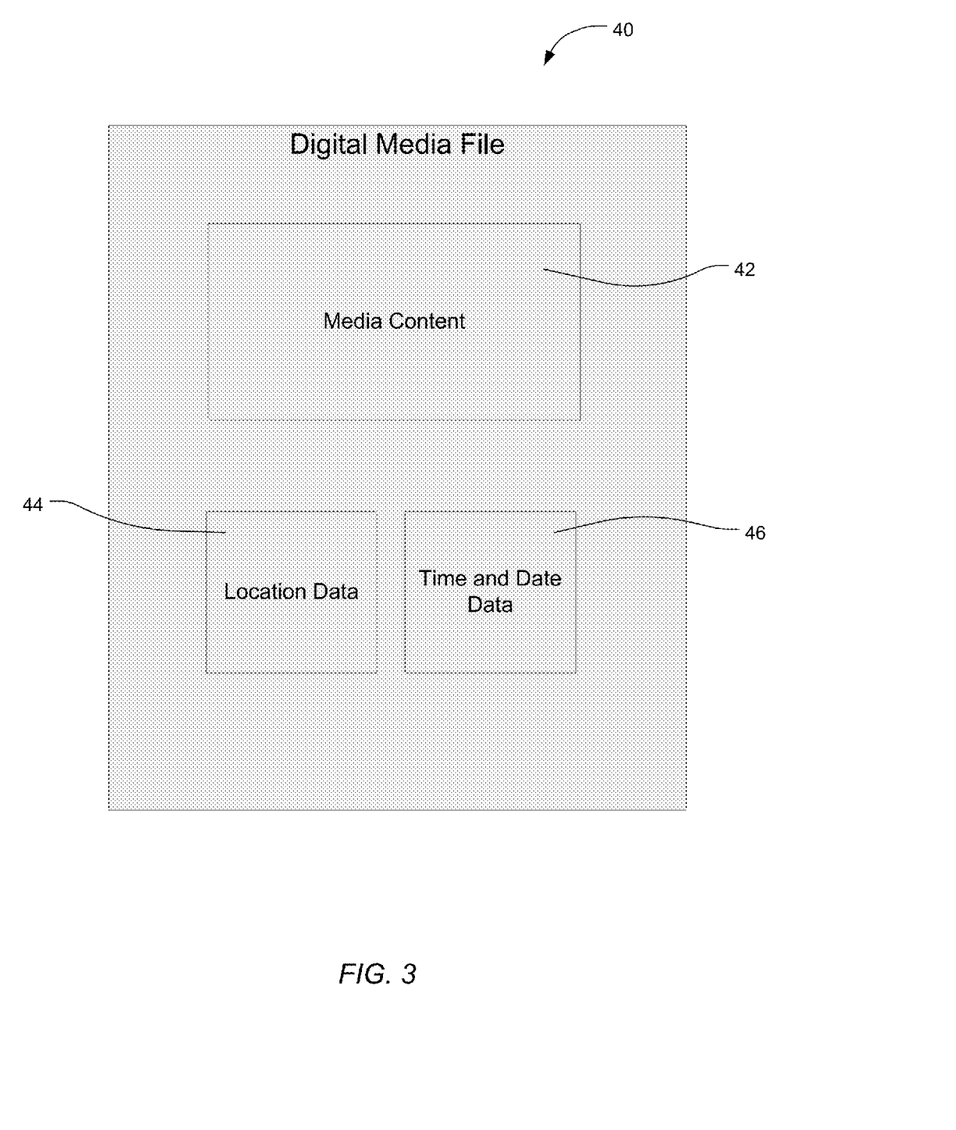
FIG. 3 is a block diagram of a digital media file that may be used according to an embodiment of the invention.

FIG. 3 illustrates a block diagram of a digital media file 40 which may be used according to an embodiment of the invention. Digital media file 40 may include media content 42, location data 44 and time and date data 46. As noted above, media content 42 may be an electronic picture, movie, recording or any other media in an electronic format, and location data 44 may be any data that represents a geographic location. In one example, digital media file 40 may be formatted in accordance with the exchangeable image file (Exif) standard for images, sounds used by digital cameras, smart phones, scanners and other systems handling image and sound files for digital cameras and smart phones. Other examples of standards for digital media files include TIFF, TIFF/EP and DCF formats. In a different example, digital media file 40 may not include location data, time and date data, or both.

Figure 4:
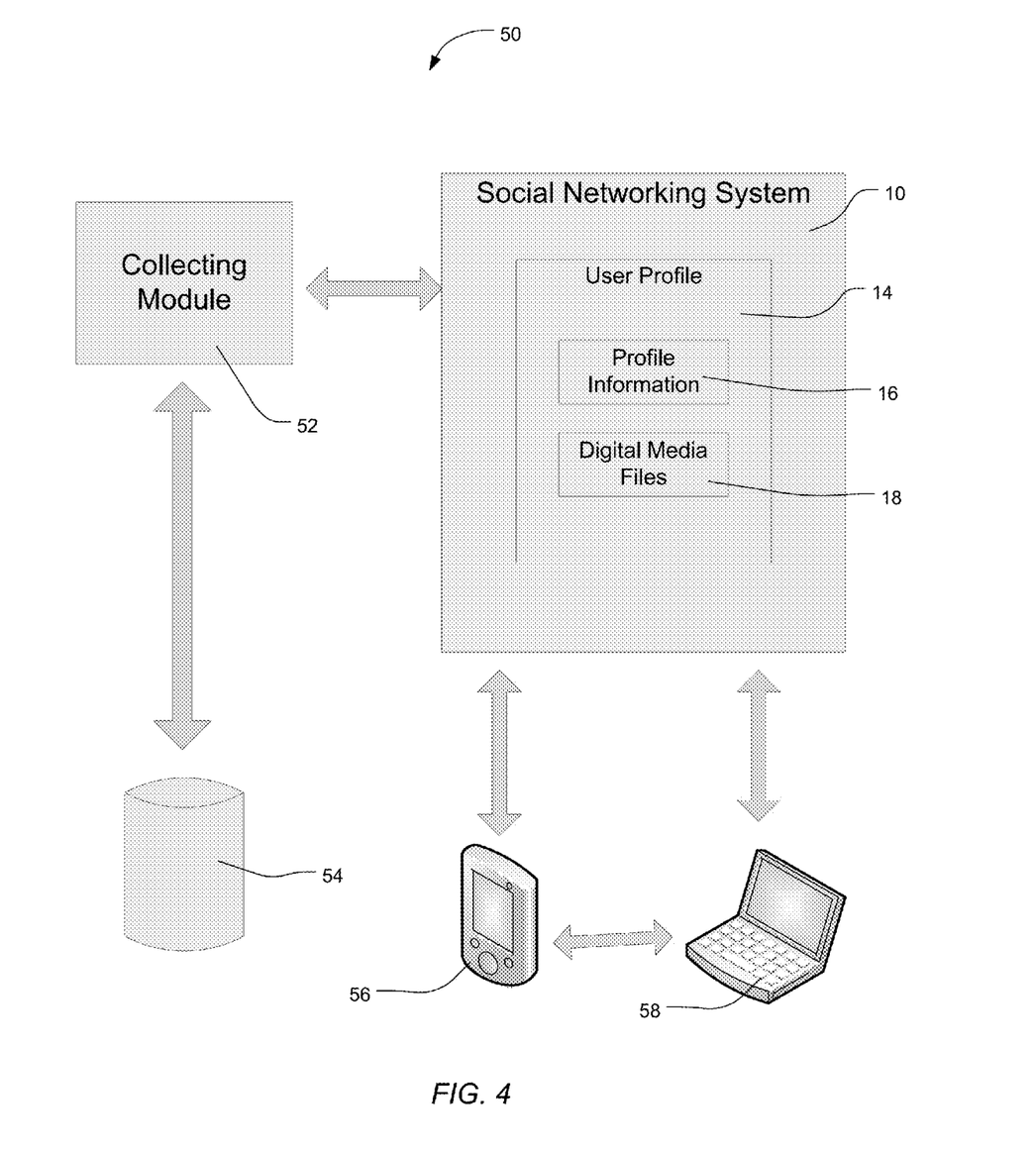
FIG. 4 is a block diagram of a system for collecting social networking information according to an embodiment of the invention.

FIG. 4 is a block diagram of a system 50 for collecting social networking information according to an embodiment of the invention. System 50 includes social networking system 10 as illustrated in FIG. 1. As noted above, social networking system 10 includes user profile 14 which includes profile information 16 and digital media files 18. Additionally, system 50 may include a collecting module 52, a data repository 54, a mobile device 56 and a computer 58. Generally, system 50 provides for the automatic collection of social networking information from digital media associated with a user profile. The method of automatic collection is described below in greater detail with reference to FIG. 5.

Collecting module 52 may be configured to automatically communicate with social networking system 10, access and analyze profile information 16 and digital media files 18 of user profile 14, and automatically generate social networking information based on digital media files 18. The term "communicating" may include read and write access to information contained in an element. The analysis of the digital media files 18 may require collecting module 52 to communicate with data repository 54. Data repository 54 may comprise a single database or multiple databases, and may be stored in one or more computer-readable memory devices, such as a hard disk drive, solid state memory or another form of computer memory. Data repository 54 may also be housed within or in communication with one or more computers. In some examples, data repository 54 may be part of an existing software application.

It should be appreciated that depiction of collecting module 52 as a module is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

System 50 may also include mobile device 56 and/or computer 58. Mobile device 56 may be a cell phone, smart phone or PDA as illustrated in FIG. 2, and computer 58 may be a desktop computer, laptop or tablet. Mobile device 56 and computer 58 may communicate with social networking system 10 to modify user profile 14. More specifically, mobile device 56 and computer 58 may create or update the personal information of user profile 14. Furthermore, mobile device 56 and computer 58 may be configured to capture and upload digital media files to user profile 14. As noted above, digital media files may be transferred from mobile device 56 to computer 58, where it is then uploaded to user profile 14.

Of course, the system shown in FIG. 4 is just one example of a possible system configuration for providing the functionality described herein. In describing various examples of the invention, many aspects of the examples are discussed herein in terms of functionality, in order to more particularly emphasize their implementation independence. Examples of the invention may be implemented using a combination of hardware, firmware, and/or software. For example, in many cases some or all of the functionality provided by examples may be implemented in executable software instructions capable of being carried on a programmable computer processor. Likewise, some examples of the invention include a computer-readable storage device on which such executable software instructions are stored. In certain examples, a system processor itself may contain instructions to perform one or more tasks, such as in cases where collecting module 52, data repository 54 and social networking system 10 are referenced. System processing capabilities are not limited to any specific configuration and those skilled in the art will appreciate that the teachings provided herein may be implemented in a number of different manners.

Figure 5:
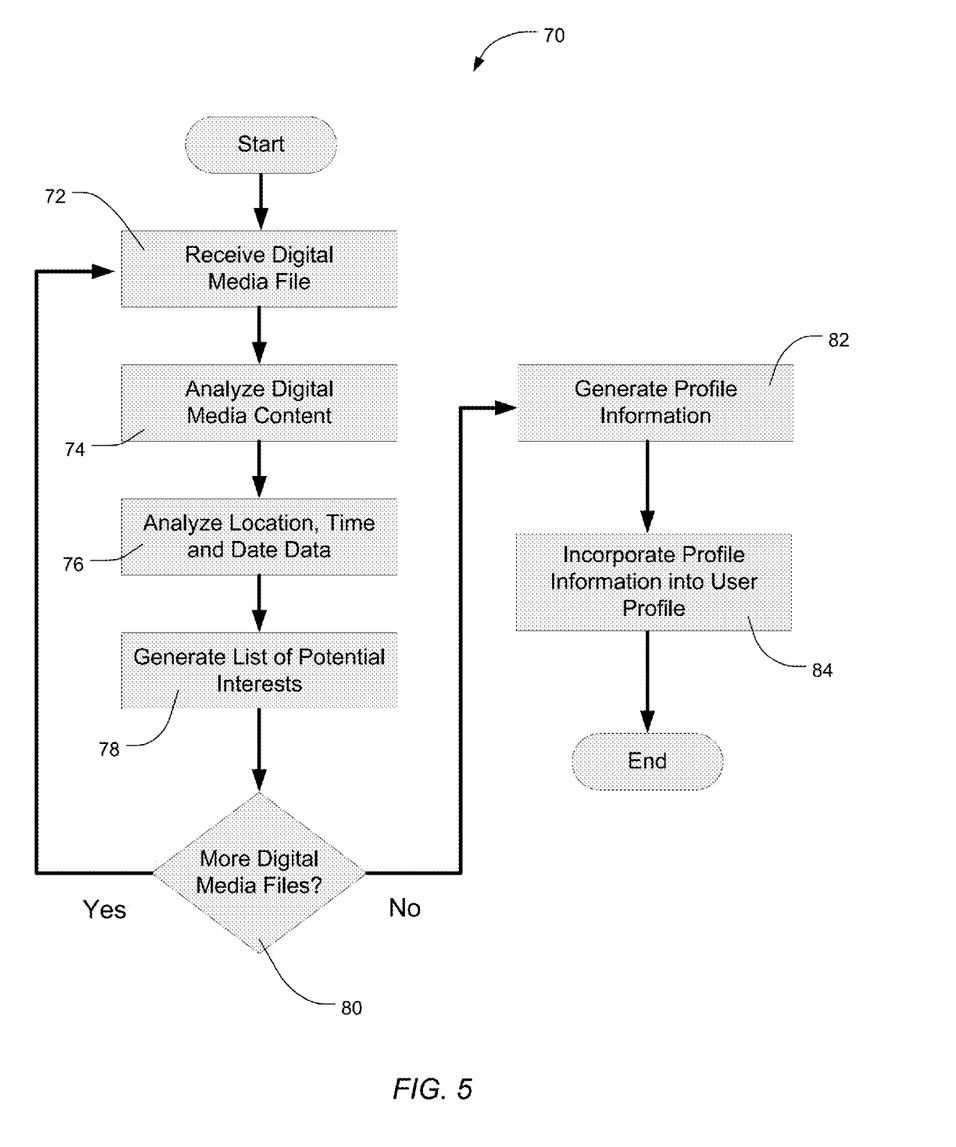
FIG. 5 is a flow diagram illustrating a method for collecting social networking information according to an embodiment of the invention.

FIG. 5 is a flow diagram illustrating a method 70 for collecting social networking information from digital media files according to an embodiment of the invention. More specifically, method 70 may help identify potential interests of an individual associated with a user profile based on where and when the digital media file was taken and/or the content of the digital media file.

The initial step of method 70 may include receiving 72 a digital media file. The term "receiving" is used herein to generally refer to the granting of access in any form to a digital media file, or simply being alerted of the presence and location of a digital media file. In one example, receiving 72 may include a social networking system 10 granting a software application access to the digital media files 18 in a user profile 14. In another example, receiving 72 may include a social networking system 10 sending a software application a pointer to digital media files 18 in a user profile 14. As illustrated, this example includes a situation in which a user posts a link to an online video (i.e. a YouTube video), and receiving 72 may include simply sending a link to an online video. In a different example, receiving 72 a digital file may include copying or transferring the file to the computer-readable memory of a computer that is programmed to perform the method 70.

Upon receiving 72 a digital media file, content analysis 74 may be performed to determine potential interests. More specifically, content analysis 74 may use media recognition technologies to determine a suspected content of the digital media file which in turn may be used to determine potential interests. Media recognition technologies may include, but is not limited to, image, sound, voice, music, video and optical character recognition technologies. Potential interests may be determined based on the suspected content of the digital media file. For example, image recognition software may analyze an electronic digital media file including a picture and identify that the picture includes the sky, the sun, a shovel, flowers and plants and an individual kneeling. The suspected content may include the above-identified elements of the picture, and based on the suspected content potential interests may include outdoors, gardening, flowers, etc. In another example, a digital media file of a song may be analyzed by a music recognition software to generate suspected content including the song title, artist, album, etc. Thus, potential interests based on this suspected content may include a music genre, an era of music, or other interests affiliated with a certain style of music.

Furthermore, different recognition technologies may be used in combination to collect more suspected content. The additional suspected content may be used to increase or gage the accuracy of potential interests or simply to identify more potential interests. For example, a picture of an individual at a sporting event may be analyzed by both an image recognition and optical character recognition software. The image recognition software may identify a logo of a team and the optical character recognition software may identify a name of a team in the picture. In one example, the image recognition software and the optical character recognition software may identify the same team, thus it is likely accurate that the individual is a fan of the team. In another example, the imaging recognition software and the optical character recognition software may identify different teams (i.e. a home team and an away team). Both teams may be identified as potential interests but the conflicting information may later be used in generating a confidence interval that the team is actually an interest of the individual. As above, the determination of potential interests corresponding to the suspected content of a digital media file may require accessing a data repository that correlates potential interests with locations, times dates.

Figure 6:
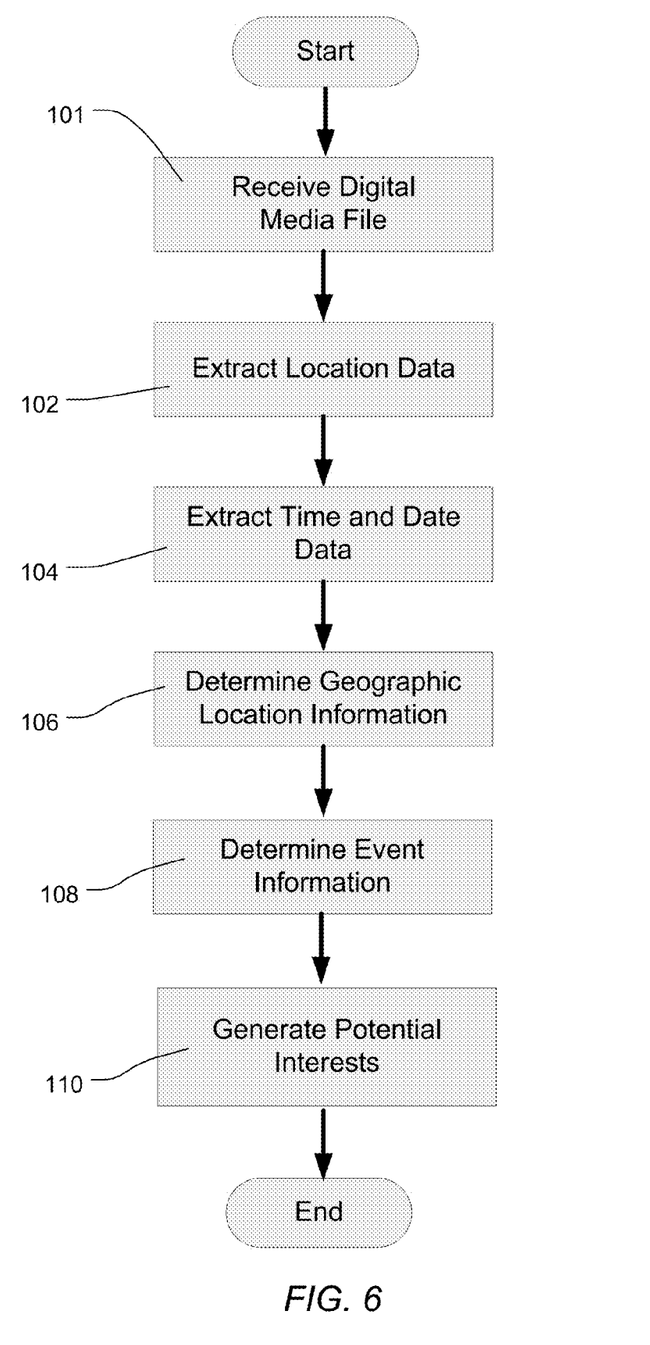
FIG. 6 is a flow diagram illustrating a method 100 for performing data analysis according to an embodiment of the invention.

Alternatively, or additionally, data analysis 76 of the digital media file may be performed to determine where and when the digital media file was created. FIG. 6 is a flow diagram illustrating a method 100 for performing data analysis. The initial step may include receiving 101 a digital media file and extracting 102 location data from the digital media file. As noted above, a digital media file may include location data indicative of where a digital media file was created. A geographic location represented by the location data may be determined 106 by accessing a data repository that correlates the location data with a geographic location. For example, the location data extracted 104 from the digital media file may be a GPS coordinate expressed in latitude and longitude. The geographic location represented by the GPS coordinate may be determined by accessing a data repository that correlates GPS coordinates with geographic locations. Similarly, time and date data may be extracted 104 from the digital media file indicative of a time and date when the digital media file was created. The time and date data may then be used along with the geographic location to determine 108 event information associated with the digital media file. Event information may be determined by accessing a data repository that correlates geographic information and time and date information with event information. For example, where a photograph was taken at the Sydney Opera House, cross referencing the geographic location with a time and data may yield an event that occurred at that venue on that particular day.

Potential interests may then be generated 110 based on the geographic location and/or the event information. For example, it may be determined that a digital media file was created in Sydney, Australia at the Sydney Opera House. Based on this information, potential interests for the individual associated with the digital media file may include music, concerts, opera, orchestra, classical music, etc. Generating 110 potential interests corresponding to a geographic location may require accessing a data repository that correlates potential interests with geographic locations. Similarly, potential interests may also be generated 110 based on event information. For example, it may be determined that a U2 concert took place at the Sydney Opera House on the day a digital media file was created and thus potential interests generated 110 may include more specific interests such as "rock concerts" or "Bono" based on the event information. Event information may still be useful in generating 110 potential interests even if there is no formal event that corresponds with the geographic location and time and date data. For example, a photograph may be taken in the middle of a lake in Minnesota, USA. If the photograph was taken in the summer, then potential interests may include boating, swimming, fishing, sun bathing, the outdoors, etc. Conversely, if the photograph was taken in the winter, then potential interests may include ice fishing, ice skating, riding snow mobiles, cross country skiing, the outdoors, etc. As above, generating 110 potential interests corresponding to event information may require accessing a data repository that correlates potential interests with event information.

Referring back to FIG. 5, it should be noted that the identification of potential interests occurring in data analysis 76 and content analysis 74 is not limited to any degree of specificity. It should be appreciated that very broad interest categories like "music" or "enjoys the outdoors" may have comparable value to more specific interests in similar categories like "European free jazz" and "hiking the Bad Lands of South Dakota," respectively. In some embodiments, more specific interests identified by data analysis may be further classified into less specific, broader categories of interests. This may be accomplished by correlating more specific interests to broader categories of interests according to information included in the data repository 54, for example. The interests included in the media-based profile information may therefore include more specific interests identified by analyzing the media and/or more general categories of interests identified by association with the more specific interests. For example, a user with media indicating an interest in a particular basketball team may be classified specifically as a fan of the particular team, or more generally as a fan of basketball, or further more generally as a fan of spectator sports. Any one or all three of these interests, from the most specific to the most general, may be included in the user profile. It may be important to note that the classification of interests into categories is not limited to the scope (e.g., specificity or broadness) of the interest. Furthermore, the categories of interests may be correlated on a basis other than the scope of the interest. For example, the interest category of "enjoys skateboarding" may be correlated with the category "enjoys alternative rock music," even though neither interest is a broader or more specific category of the other.

It should also be appreciated that any of the methods discussed in relation to data analysis 76 and content analysis 74 may be used alone or in any combination with each other. As noted above, method 70 is an exemplary example which employs all the methods discussed above. Advantages of generating a more exhaustive list of interests is explained below when media-based profile information is generated 82.

Once the digital media file has been analyzed, the potential interests identified in the data analysis and the content analysis may be compiled to generate 78 a list of potential interests for the individual associated with the digital media file. The list of potential interest is associated with the digital media file from which it was derived. The list may specify, or not, the method by which the potential interests were identified. For example, a list may be generated 78 that notes which potential interests were identified by data analysis 76 and content analysis 74. In another example, a list may be generated with more specificity, identifying the recognition technology used in identifying a potential interest. In a different example, generating a list may simply be compiling all the potential interests into a raw list with additional information. As will be discussed below, the method by which a potential interest was identified may be helpful in determining a confidence or accuracy interval for a potential interest.

Once a list of potential interests for a particular digital media file has been generated 78, method 70 determines whether there are any additional digital media files to analyze in step 80. If there are additional files, method 70 will receive 72 the file, perform data analysis 76 and content analysis 74 on the file, then generate 78 a list of potential interests for that particular digital media file. These steps are repeated until it is determined in step 80 that there are no additional media files, at which point method 70 continues on to generating 82 media-based profile information.

Media-based profile information may then be generated 82 by examining the lists of potential interests for each digital media file. Media-based profile information is profile information that is derived from digital media files and includes interests from the lists of potential interests most likely to be applicable to the individual associated with the user profile. Media-based profile information may be characteristically similar to profile information 16 discussed in FIG. 1. For example media-based profile information, like profile information 16, may contain social networking information including, but not limited to, biographical, personal, professional and education information. As will be discussed below, it may be advantageous to differentiate profile information derived from a digital media file from user-specified profile information when the two are incorporated 84 into the user profile.

Generally, generating 82 media-based profile information may include categorizing and assigning an accuracy or confidence interval to the potential interests, then based on the confidence interval, selecting the interests most likely to be associated with a user profile. In generating 82 the media-based profile information, method 70 may individually examine the list of potential interests for each digital media file and assign a confidence interval for each unique potential interest in the list. Method 70 may then collectively analyze and consolidate the potential interests lists from all the digital media files to generate 72 the media-based profile information.

In determining a confidence interval, method 70 may compare the potential interests with profile information specified by an individual in a user profile. For example, recall the example above where analyzing a picture taken at the Sydney Opera House yielded a list of potential interests including music, concerts, opera, orchestra, classical music, etc. Where an individual specifies in the user profile that they really enjoy music, method 70 may assign a higher confidence interval to these interests. Conversely, where a user specifies that they dislike music, a lower confidence interval may be assigned to these potential interests. Comparing a list of potential interests to the profile information of the user profile may also yield new potential interests based on the context provided by the user specified profile information. Again referencing the example of a picture taken at the Sydney Opera House, if the individual specifies in the user profile that they live in New York, N.Y., then the potential interest list may be expanded to include tourism, traveling, Australia, Sydney, etc.

Many factors may be considered when determining the confidence interval for a particular potential interest. For example, method 70 may take into account repetition, category and method or source of the potential interests.

In determining the confidence interval for a potential interest, method 70 may take into account the number of times a potential interest is repeated in a list of potential interests for a specific digital media file as well as the number of digital media files that include that particular potential interest. For example, if the potential interest "likes basketball" appears in a list of potential interest several times, then a high confidence interval may be assigned to that interest. If that same interest occurs in numerous digital media files, then an even higher confidence interval may be assigned to that interest.

The categories of the potential interests may also be taken into account when determining confidence intervals for the interests. Generally, the lack of repetition of a potential interest does not necessarily mean that an individual does not have that interest. For example, the interest "like European free jazz" may only occur once in only one digital media file. Method 70 may still assign a higher confidence interval to the interest, however, where the individual has many other interests, user specified or otherwise, related to music and jazz.

Also, as already noted above, the method or source by which a potential interest is derived may be taken into account when determining a confidence interval. Generally, a higher confidence interval may be assigned to potential interests determined using more reliable methods. For example, where video recognition technology is behind or inferior to image recognition technology, an interests derived from the latter may be assigned a higher confidence interval than one derived from the former. Or, method 70 may value data analysis above content analysis and therefore assign higher confidence intervals to potential interests derived from the former. Similarly, method 70 may favor potential interests from certain digital media files over others. For example, a lower confidence interval may be assigned to interests derived from a digital media file that does not include location, time and date data than interests derived from a file including that data.

Once confidence intervals are assigned to the potential interests, media-based profile information may be generated 82 by selecting interests that have a confidence interval above a certain threshold. While only a number of factors have been discussed, it can be appreciated that method 70 may take into account many other factors in determining confidence intervals.

After the media-based profile information has been generated 82, method 70 may incorporate 84 the media-based profile information into a user profile. The method of incorporation may vary based on the type and objectives of a social network system. Different types of social network systems may include social networks (e.g. Facebook, Twitter, Instagram), dating networks (e.g. Match.com, eHarmony), or professional network (e.g. LinkedIn). Different objectives may include, but are not limited to, generating better matches between users, streamlining the entry of profile information into a user profile, ensuring accuracy of user specified profile information, targeting commercial advertising and/or enhancing the user experience.

A social networking system may privately incorporate the media-based profile information into a user profile to generate better matches between users. For example, a user who has attended ACME High School may not have specified in their user profile that they attended that school. As a result, a social networking system may not know to connect the user with other individuals who have attended ACME High School. However, the user may have uploaded numerous digital media files of photos that were taken at ACME High School during a specific time span. Using this media-based profile information, the social networking system may suggest other users who attended ACME High School during the same time span.

A social networking system may also publically incorporate the media-based profile information directly into a user profile to streamline the process of creating or updating the profile. In one example, when a user uploads digital media files in creating or updating a user profile, method 70 may automatically generate 82 media-based profile information from the uploaded files and automatically populate the user profile with suggested interests. This example of incorporating 84 may be more suitable for casual social network systems. In other social network systems, like dating and professional networks, a user may be more sensitive to the content of their user profile. In such networks, method 70 may prompt or suggest interests to the user and allow the user to accept or decline the suggested interests before incorporating them into the user profile.

Certain social networks may be interested in ensuring the accuracy of user specified profile information. For example, a dating network may be wary of individuals who misrepresent themselves in their user profiles. Method 70 may then use the media-based profile information to automatically correct a user profile where it determines that the profile information reflects a misrepresentation. In another example, method 70 may generate an accuracy metric for each user profile based on a comparison between user specified profile information and media-based profile information. The accuracy metric may be private to help network administrators identify deviant users, or the accuracy metric may be publicly displayed in the user profile for the benefit of other users.

In another example, the media-based profile information may be incorporated into the user profile in such a way that enables the social networking system to display relevant commercial advertisements to an individual. For example, a user may not have specified that they like basketball in their user profile, but have uploaded digital media files indicating an interest in basketball. The social networking system may then use this media-based profile information to display basketball related content to the individual.

In a similar example, the social networking system may use the media-based profile information to enhance the user experience. For example, a user may not have specified that they are a diehard Manchester United fan but they have uploaded numerous digital media files that indicate that interest. Using this media-based profile information, the social networking system may suggests a customizable color scheme consistent with Manchester United team colors, or embed the Manchester United logo in the individual's user profile. While this application has discussed a number of methods of incorporating, or utilizing, media-based profile information, it can be appreciated that there are many other methods of incorporating and utilizing this data.

It should also be appreciated that the method 70 of collecting social networking information does not require a social networking system and that a social networking system is only one example where a method of collecting information from digital media files may be used. For example, a method similar to method 70 may be used in the field of data forensics to determine the content of a plurality of digital media files. Similarly, a method similar to method 70 may be implemented as a standalone software application that may be installed and operated on a private computer to help categorize digital media files.

The methods and techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. As noted above, depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The methods and techniques described in this disclosure may also be embodied or encoded in a non-transitory computer-readable medium, such as a computer-readable storage medium, containing instructions. Instructions embedded or encoded in a computer-readable storage medium may cause a programmable processor, or other processor, to perform the method, e.g., when the instructions are executed. Non-transitory computer readable storage media may include volatile and/or non-volatile memory forms including, e.g., random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A method comprising:
    accessing, using a computing device comprising one or more programmable processors, a user profile associated with a user, the user profile comprising profile information and at least one digital media file;
    extracting, using the computing device, media content from each digital media file;
    generating, using the computing device, a suspected content for each digital media file based on the media content of each digital media file;
    determining, using the computing device, a set of potential interests for each digital media file based on the suspected content of each digital media file, wherein each set of potential interests includes a plurality of potential interests;
    generating, using the computing device, media-based profile information based on the sets of potential interests of the digital media files, wherein the media-based profile information includes potential interests from the sets of potential interests associated with the user, wherein generating media based profile information further comprises:
        calculating, using a computing device, a confidence interval for each potential interest determined based on how many times the potential interest occurs in the set of potential interests for each digital media file, and
        generating, using a computing device, media-based profile information from the potential interests using the confidence interval;
    incorporating, using the computing device, the media-based profile information into the user profile; and
    storing the user profile with the media-based profile information in a non-transitory computer-readable medium.

2. The method of claim 1 wherein determining a set of potential interests further comprises accessing, using the computing device, a data repository, wherein the data repository contains information correlating the suspected content with potential interests.

3. The method of claim 2 further comprising organizing the information in the data repository into different categories of potential interests based on a scope of the potential interests.

4. The method of claim 1 wherein calculating a confidence interval for each potential interest is additionally based on the profile information in the user profile.

5. The method of claim 1 wherein extracting media content from each digital file further comprises extracting location, time and date data from each digital media file.

6. The method of claim 5 wherein determining a set of potential interests further comprises; determining a geographic location and event corresponding to the location, time and date data by using the computing device to access a data repository; determining the set of potential interests based on the geographic location and event by using the computing device to access the data repository; and wherein the data repository contains information correlating 1) location, time and date data with geographic locations and events; and 2) geographic locations and events with the sets of potential interests.

7. A system comprising:
a social networking system which includes a plurality of user profiles, the user profiles including profile information and at least one digital media file;
at least one programmable processor adapted to execute a collection module;
a data repository which includes information correlating suspected content with potential interests;
wherein the collection module is adapted to receive digital media files from the social networking system;
wherein the collection module is adapted to analyze the digital media files to determine a suspected content for each of the digital media files;
wherein the collection module is adapted to access the data repository to determine a set of potential interests based on the suspected content of the digital media file for each of the digital media files;
wherein the collection module is adapted to analyze the sets of potential interests to generate media-based profile information by:
calculating, using a computing device, a confidence interval for each potential interest determined based on how many times the potential interest occurs in the set of potential interests for each digital media file, and
generating, using a computing device, media-based profile information from the potential interests using the confidence interval;
wherein the collection module is adapted to incorporate the media-based profile information into the user profile; and
a non-transitory computer-readable medium adapted to store the user profile with the media-based profile information.

8. The system of claim 7 further comprising: wherein the collection module is adapted to analyze the digital media files to determine location, time and date data for each of the digital media files; and wherein the collection module is adapted to access the data repository to determine a set of potential interests based on the location, time and date data for each of the digital media files.

9. The system of claim 7 wherein the confidence interval for each potential interest is additionally calculated based on the profile information in the user profile.

10. The system of claim 7 wherein the data repository further includes information correlating 1) location, time and date data with geographic locations and events; and 2) geographic locations and events with potential interests.

11. The system of claim 7 wherein the data repository further includes potential interests organized into different categories based on a scope of the potential interests.

12. A non-transitory computer-readable storage article having computer-executable instructions stored thereon comprising a collection module, wherein the computer-executable instructions cause at least one programmable processor to:
receive digital media files from a user profile;
analyze the digital media files to determine a suspected content for each of the digital media files;
access a data repository to determine a set of potential interests based on the suspected content of the digital media files for each of the digital media files;
analyze the sets of potential interests to generate media-based profile information, wherein generating media based profile information comprises:
calculating a confidence interval for each potential interest determined based on how many times the potential interest occurs in the set of potential interests for each digital media file, and
generating media-based profile information from the potential interests using the confidence interval;
incorporate the media-based profile information into the user profile; and
store the user profile with the media-based profile information in a non-transitory computer-readable medium.

13. The article of claim 12 wherein the data repository further includes potential interests organized into different categories based on a scope of the potential interests.

14. The article of claim 12 further comprising executable instructions to cause the collection module to: analyze the digital media files to determine location, time and date data for each of the digital media files; and access a data repository to determine a set of potential interests based on the location, time and date data for each of the digital media files.

* * * * *